(12) United States Patent
Shah et al.

(10) Patent No.: US 9,264,312 B2
(45) Date of Patent: Feb. 16, 2016

(54) METHOD AND SYSTEM TO CALCULATE MULTIPLE SHORTEST PATH FIRST TREES

(71) Applicant: CISCO TECHNOLOGY, INC., San Jose, CA (US)

(72) Inventors: Varun Shah, Milpitas, CA (US); Madhukar Anand, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 127 days.

(21) Appl. No.: 14/042,347

(22) Filed: Sep. 30, 2013

(65) Prior Publication Data

US 2015/0092609 A1 Apr. 2, 2015

(51) Int. Cl.
*H04L 12/24* (2006.01)
*H04L 12/733* (2013.01)
*H04L 12/753* (2013.01)
*H04L 12/761* (2013.01)

(52) U.S. Cl.
CPC .............. *H04L 41/12* (2013.01); *H04L 45/122* (2013.01); *H04L 45/48* (2013.01); *H04L 45/16* (2013.01)

(58) Field of Classification Search
CPC ................... G06F 17/30327; G06F 17/30911; G06F 17/30938
See application file for complete search history.

(56) References Cited

U.S. PATENT DOCUMENTS 7,911,944 B2 * 3/2011 Chiabaut et al. .............. 370/229
8,868,715 B2 * 10/2014 Bearden et al. ............... 709/224
8,885,643 B2 * 11/2014 Mack-Crane et al. ........ 370/390

OTHER PUBLICATIONS

Yanagisawa, Y., "A Multi-Source Label-Correcting Algorithm for the All-Pairs Shortest Paths Problem," 2010 IEEE International Symposium on Parallel and Distributed Processing (IPDPS), Apr. 19-23, 2010, 10 pages.

Yuichiro, Y., et al. "NETAL : High Performance Implementation of Network Analysis Library Considering Computer Memory Hierarchy," Special Issue-Scope (Seminar on Computation and Optimization for new Extensions)), Journal of the Operations Research Society of Japan, vol. 54, No. 4, Dec. 2011, pp. 259-280.

* cited by examiner

*Primary Examiner* — Chandrahas Patel
(74) *Attorney, Agent, or Firm* — Patent Capital Group

(57) ABSTRACT

An example method is provided in accordance with one embodiment and includes identifying distances for a sub-tree of a leaf node of a plurality of leaf nodes in a network. The method can also include applying the distances for the sub-tree of the leaf node to a plurality of root nodes connected to the leaf node. Additionally, the method can include establishing a plurality of shortest path distances for the plurality of root nodes using the distances for the sub-tree.

20 Claims, 6 Drawing Sheets

METHOD AND SYSTEM TO CALCULATE MULTIPLE SHORTEST PATH FIRST TREES

TECHNICAL FIELD

This disclosure relates in general to the field of computer networking and, more particularly, to techniques for calculating multiple shortest path first trees rooted at different nodes.

BACKGROUND

Internet Protocol ("IP") fabric Vinci is a relatively new architecture for data center networking. The physical topology of IP fabric Vinci is based on a multiple-tier fat-tree, also called a Clos network, where every leaf switch is connected to every spine switch and vice versa. The topology is guaranteed through mechanisms that enable automatic detection of miscabling between link peers in the network fabric based on tier level checks and/or a user-defined cable plan. Within the fabric, a link state protocol, such as Intermediate System to Intermediate System ("IS-IS") or Open Shortest Path First ("OSPF"), may be used for unicast control.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes identifying distances for a sub-tree of a leaf node of a plurality of leaf nodes in a network. In a general sense, the term 'identifying' includes any activity associated with evaluating, labeling, assessing, recognizing, or otherwise processing the distances. The method also includes applying (e.g., associating, correlating, linking, or otherwise relating) the distances for the sub-tree of the leaf node to a plurality of root nodes connected (wired or wirelessly) to the leaf node. The method can further include establishing a plurality of shortest path distances for the plurality of root nodes using the distances for the sub-tree.

Example Embodiments

Figure 1:
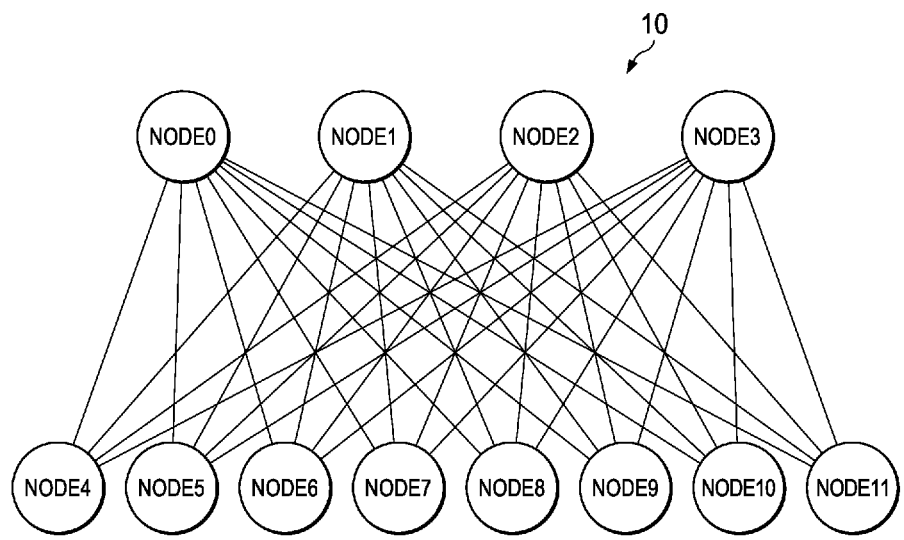
FIG. 1 illustrates an example Vinci deployment in accordance with an embodiment.

FIG. 1 illustrates an example Vinci deployment in accordance with an embodiment. As shown in FIG. 1, a communication system 10 includes four spine routers, or nodes, node0, node1, node2, and node3, along with eight leaf routers, or nodes, node4, node5, node6, node7, node8, node9, node10, and node11. In one example implementation, each of the leaf nodes node4, node5, node6, node7, node8, node9, node10, and node11 is connected to each of the spine nodes node0, node1, node2, and node3 in accordance with Vinci two-tier fat tree topology.

As used herein, Dynamic Fabric Automation ("Vinci") refers generally to a data center fabric architecture built on a spine-leaf topology that provides optimal connectivity at layer 2 ("L2") and layer 3 ("L3") between hosts that are connected to leaf switches in the fabric and between hosts and the external network. In general terms, Vinci is a software architecture that can exploit virtualization to share in a secure way an information and communication technology infrastructure among a set of users with distinct security levels and reliability requirements. To this purpose, Vinci decomposes users into communities, each consisting of a set of users, their applications, a set of services and shared resources. Users with distinct privileges and applications with distinct trust levels belong to distinct communities. Each community is supported by a virtual network (i.e., a structured and highly parallel overlay that interconnects virtual machines (VMs), each built by instantiating one of a predefined set of VM templates). Some VMs of a virtual network run user applications, some protect shared resources, and some others control traffic among communities to discover malware or worms. Further VMs manage the infrastructure resources and configure the VMs at start-up. The adoption of several VM templates enables Vinci to minimize the complexity of each VM and increases the robustness of both the VMs and of the overall infrastructure.

The control plane, enhanced forwarding semantics, and management techniques provide the framework to support L2 or L3 fabrics. Any suitable encapsulation can be used to transport packets across the fabric where the transit nodes switch only on the fabric overlay header. Different implementations of the Vinci architecture may be based on an IP fabric, FabricPath encapsulation, or Transparent Interconnection of Lots of Links (TRILL). The L2 and L3 traffic being forwarded between the leaf nodes may be encapsulated in an IP. The nodes in the fabric that provide transit, such as the spine nodes, may switch traffic based on the information in the IP header.

In an embodiment, FabricPath introduces an entirely new Layer 2 data plane by encapsulating the frames entering the fabric with a header that consists of routable source and destination addresses. These addresses are the address of the switch on which the frame was received and the address of the destination switch to which the frame is heading. From there, the frame is routed until it is can reach the remote switch, where it is de-encapsulated and delivered in its original Ethernet format. Overlay networks in general, and Internet protocol ("IP") overlay networks in particular, are gaining popularity for providing virtual machine ("VM") mobility over L3 networks.

One approach is to use an existing IP multicast protocol, such as Protocol Independent Multicast ("PIM"). Another approach is to use the Transparent Interconnection of Lots of Links ("TRILL") distribution tree scheme, as described in Internet Engineering Task Force Request for Comments:

6325 ("IETF RFC 6325"). Another approach is to use head end leaf replication to send a multi-destination packet as multiple unicast packets.

In accordance with various embodiments described herein, a distribution tree can be used to support IP multicast and/or non-IP multicast in IP fabric Vinci. In one embodiment, a distribution tree is rooted at a spine node and can reach all leafs directly, as illustrated in FIG. 1. In at least one example implementation of the present disclosure, instead of running multiple instances of Dijkstra's single source shortest path (SPF) algorithm to compute loadbalanced shortest path trees (SPT) for use in multicast TRILL/FP in a Vinci-like topology, the system can run a modified SPF (M-SPF) algorithm to efficiently compute loadbalanced shortest path trees. Additionally, these activities can account for common subgraphs and pruning strategies, for example, based on certain load-balancing requirements.

Note that such activities can offer an efficient technique to compute loadbalanced SPTs in a single pass, as opposed to iterating over the same graph several times. A typical layer-two link state protocol uses multi destination trees (that are rooted at different nodes) to deliver multicast traffic. In order to calculate such multi destination trees, each node runs the SPF algorithm rooted at a node of the tree for the number of trees that it needs to calculate per topology. This can mean that, as the requirement for the number of multi destination trees grows, the computation load on each node would increase By contrast, the approach outlined herein is more efficient and, furthermore, can be particularly useful in Vinci (CLOS) topology. For example, if multiple sources share a common shortest path sub-tree, then the algorithm discussed herein would evaluate a link only once (e.g., across all sources). Empirically, the savings could be substantial, as measured by the number of iterations.

In operation of one example embodiment, if the SPT for different sources has a common optimal shortest path sub-tree, then the system can explore that sub tree only once and not evaluate those links across each of the different sources. Secondly, one characteristic of TRILL/FP/Vinci is to compute loadbalanced trees. To meet these criteria, once a link is explored, and decided to be added to the shortest path tree, it will be added to the SPT of the appropriate root. For example, if there are two sources s_1 and s_2, and least cost parent vertices v_1 and v_2 leading to a vertex v, then v_1 will be added to the SPT rooted at s_1, and v_2 will be added to the SPT rooted at s_2.

Consider a case in which S is the set of sources |S| (set of roots of the multicast trees) and V is set of all nodes in the network, an assumption is made that the number of sources |S| is much smaller than the number of nodes |V| in the network (i.e., |S|<<|V|). In at least one example embodiment, the minimum key used to dequeue could be the minimum of all distances in the vector <d_1, ... d_S>, i.e., key(v)=min {d(s,v)|s in S}. In certain cases, the architecture of the present disclosure can operate most efficiently when the sources are located close to each other, and share a common sub-tree. Even at modest levels, the operations discussed herein would be no worse than running |S| instances of Dijkstra's algorithm for a single source shortest path.

Figure 2:
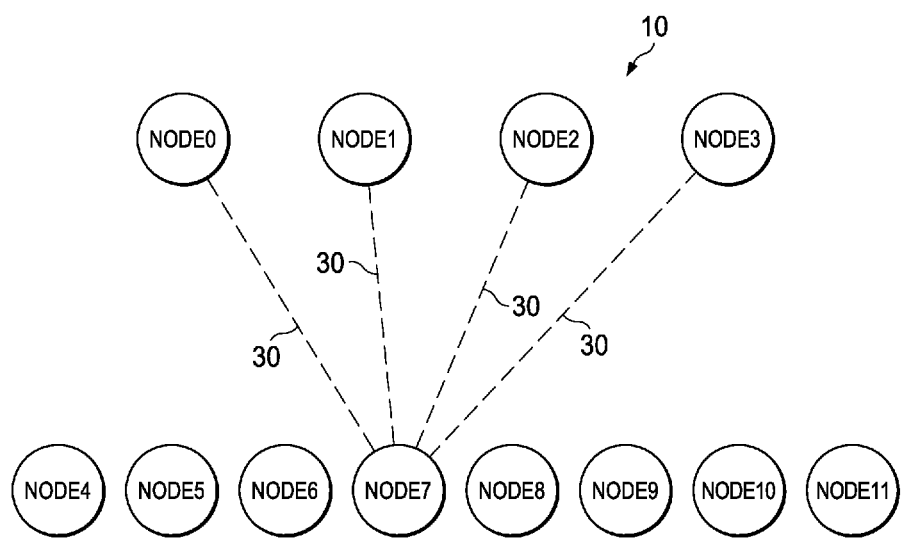
FIG. 2 illustrates an example Vinci deployment with a sub-tree in accordance with an embodiment.

Turning to FIG. 2, FIG. 2 illustrates an example Vinci deployment with a sub-tree 30 in accordance with an embodiment of the present disclosure. Sub-tree 30 (represented by a group of dashed lines) extends between node7 and node0, node1, node2, and node3. For each of the spine nodes, node7 can reach the same sub-tree. In certain cases, sub-tree 30 as described herein is made possible by taking advantage of the Vinci-specific Clos network topology.

The spine nodes are able to derive multicast states based on group interests either advertised by Border Gateway Protocol ("BGP") or queried through Locator/Identifier Separation Protocol ("LISP"). For ease of explanation, it will be assumed herein that BGP, as opposed to LISP, is used. Leaf nodes use BGP to advertise their group interest to a route reflector ("RR") (not shown), which in turn reflects the advertised group interests to spine nodes. The spine nodes will then know to which leaf nodes the multicast traffic of a group G should be sent. Each spine node will program (*, G) multicast state accordingly.

Figure 3:
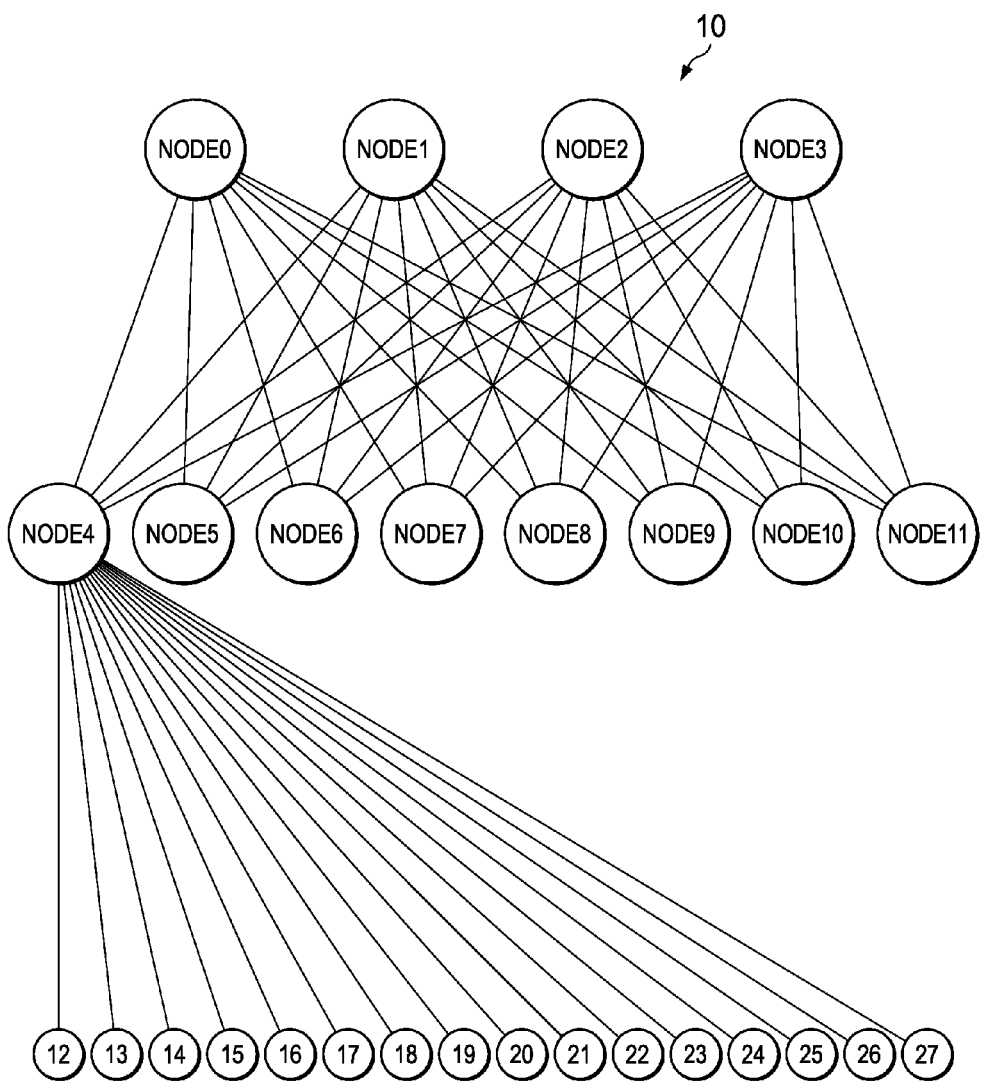
FIG. 3 illustrates an example three-layer Vinci deployment in accordance with an embodiment.

FIG. 3 illustrates an example three-layer Vinci deployment in accordance with an embodiment. As shown in FIG. 3, the network architecture includes four spine routers, or nodes, node0, node1, node2, and node3 and eight leaf routers, or nodes, node4, node5, node6, node7, node8, node9, node10, and node11. Each of the leaf nodes node4, node5, node6, node7, node8, node9, node10, and node11 is connected to each of the spine nodes node0, node1, node2, and node3. Further, each leaf nodes, node4, node5, node6, node7, node8, node9, node10, and node11 is connected (not shown) to nodes 12-27 as illustrated by only node4.

Figure 4:
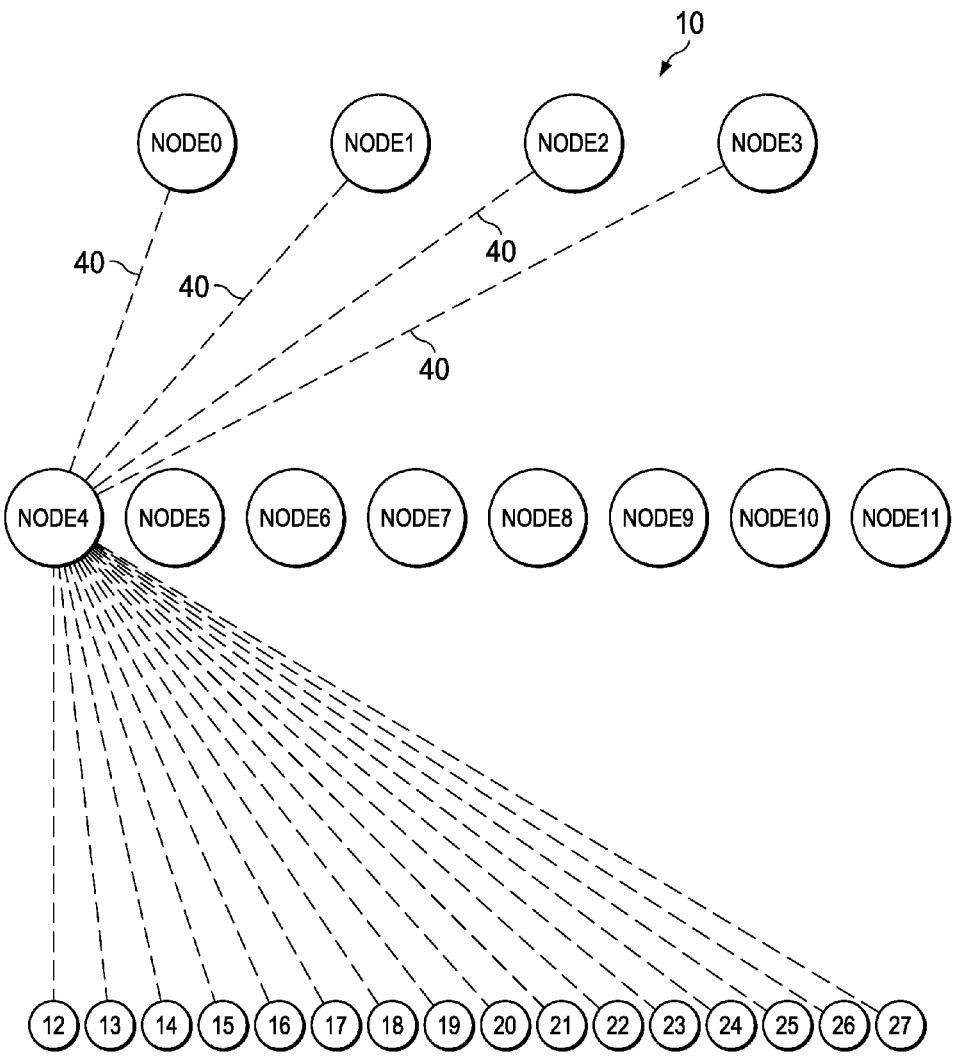
FIG. 4 illustrates an example three-layer Vinci deployment with a sub-tree in accordance with an embodiment.

FIG. 4 illustrates an example three-layer Vinci deployment with a sub-tree 40 in accordance with an embodiment. Sub-tree 40 (represented by a group of dashed lines) can extend between node4 and node0, node1, node2, node3, and nodes 12-27. For each of the spine nodes (nodes0, node1, node2, and node3), node7 can reach the same sub-tree. In certain example implementations, sub-tree 40 as described herein is made possible by taking advantage of the Vinci-specific Clos network topology.

Figure 5:
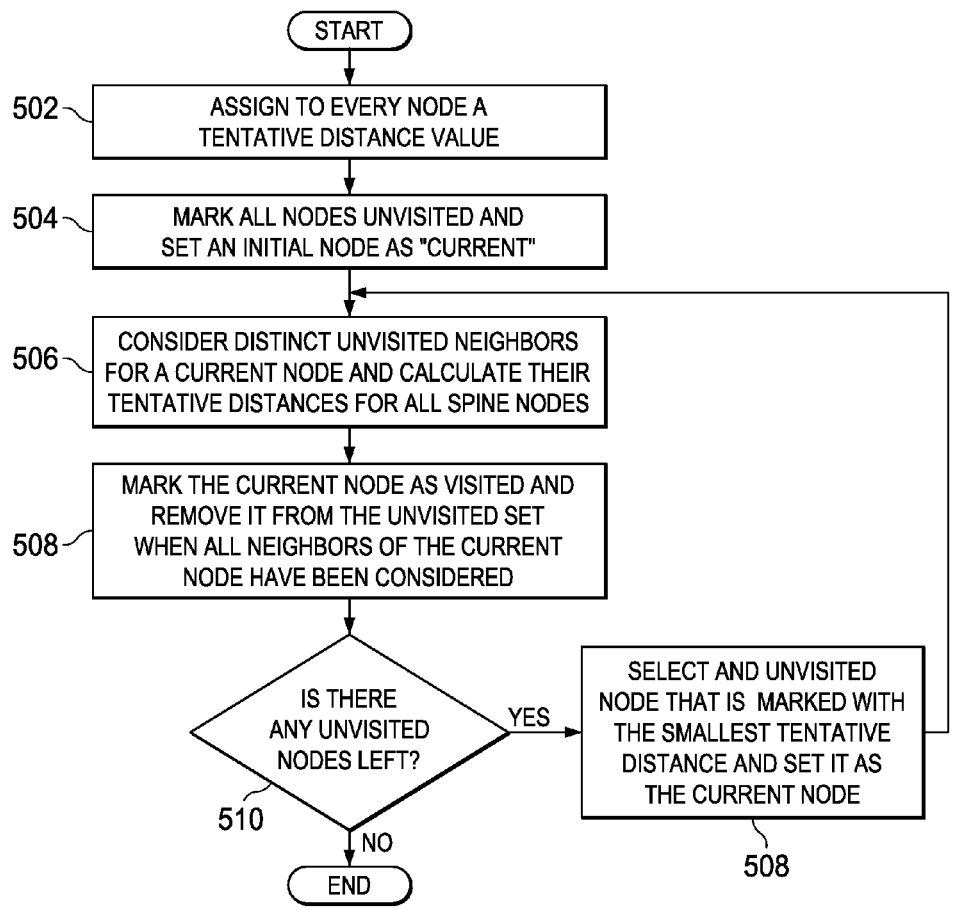
FIG. 5 is a flowchart illustrating operation of an exemplary embodiment using common node calculations for calculating multiple shortest path first trees rooted at different nodes in accordance with aspects of various embodiments.

FIG. 5 is a flowchart illustrating example operations associated with an embodiment that uses common node calculations for calculating multiple shortest path first trees rooted at different nodes. It will be recognized that the technique illustrated in and described with reference to FIG. 5 may be implemented by each spine node, in a data center, in any network element, or provisioned in another network for implementing various features described herein. Referring to FIG. 5, at block 502, an apparatus may assign to every node a tentative distance value. For example, the tentative distance value can be set to zero for all spine nodes and set to infinity for all other nodes. At block 504, an apparatus may mark all nodes unvisited and set an initial node as current. Additionally, a set of the unvisited nodes (called the unvisited set that consists of all the nodes except the initial node) can be created. The unvisited set may also be referred to as the priority queue in certain example implementations of the present disclosure. When nodes are discovered, they may be put into the priority queue and dequeued in the order of shortest distances.

At block 506, an apparatus may consider distinct unvisited neighbors for a current node and then calculate their tentative distances for all spine nodes. For example, if the current node A is marked with a distance of 0, and the edge connecting it with a neighbor B has a length 2, then the distance to B (through A) will be 0+2=2. If this distance is less than the previously recorded tentative distance of B, then the system or apparatus can overwrite that distance. Any examined nodes may be marked as distinct. Even though a neighbor has been examined, it is not marked as "visited" at this time, and it remains in the unvisited set. For each distinct node, the distances may be shared among the spine nodes.

At block 508, an apparatus may mark the current node as visited and remove it from the unvisited set when all of the neighbors of the current node have been considered. In certain cases, a visited node may not be checked again. At block 510, a determination is made if there are any unvisited nodes remaining. If there are unvisited nodes remaining, at block 512, then the apparatus or system can select an unvisited node that is marked with the smallest tentative distance, and subsequently set this as the "current node." After block 512, the apparatus may repeat block 506. If there are not any unvisited nodes remaining, then the operations may terminate naturally.

In an embodiment, the process described above may be implemented for each spine node. Additionally, any nodes that are shared for more than one spine node may only be examined once. For example, if a node has been examined for the shortest path from a first spine node, then the node may not need to be re-examined for the shortest path from a second spine node. The apparatus may use a single examination of the node for both the first spine node and the second spine node since any further examination from that node would result in the same calculations.

Figure 6:
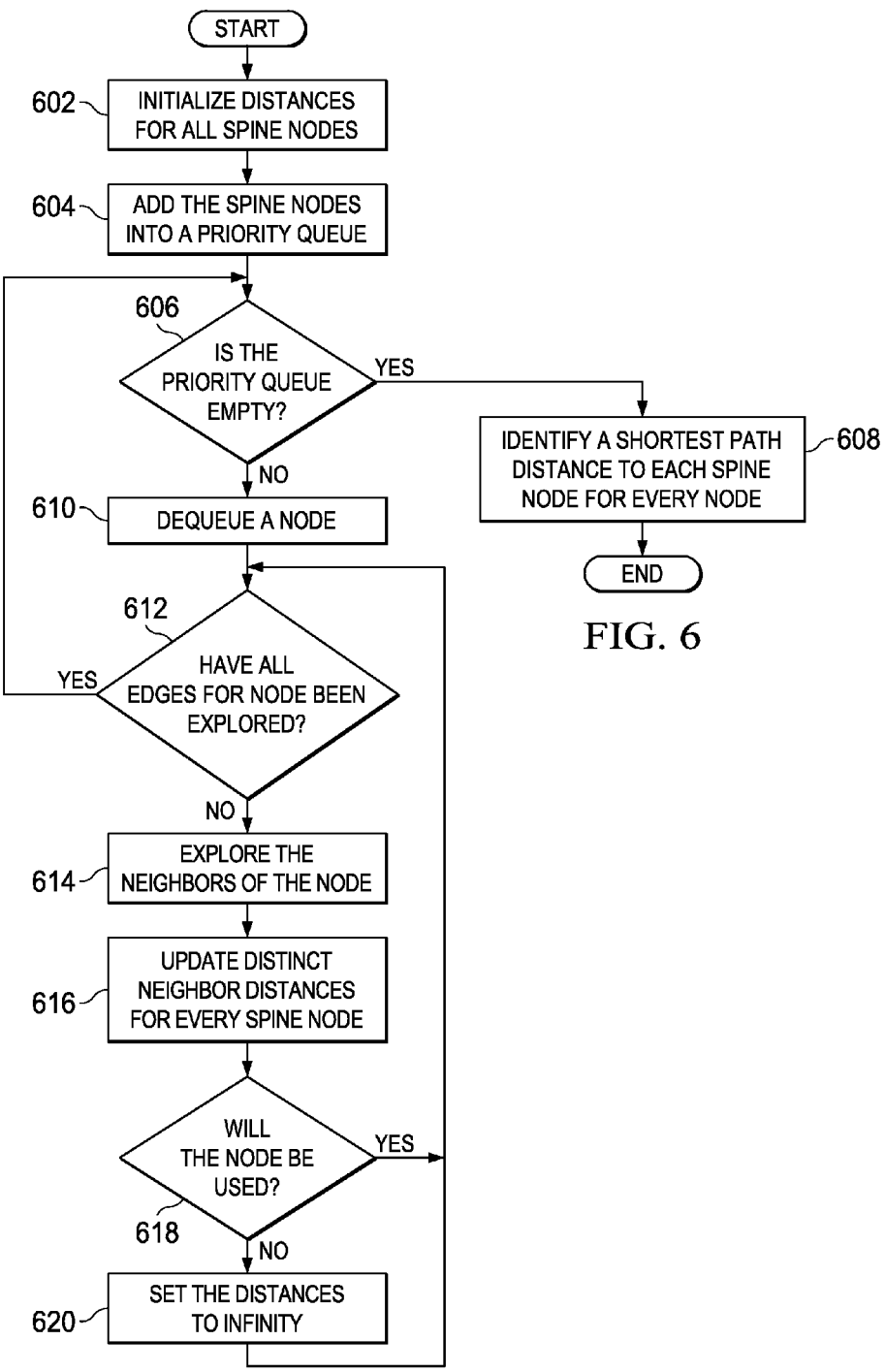
FIG. 6 is a flowchart illustrating operation of an exemplary embodiment using common node calculations for calculating multiple shortest path first trees rooted at different nodes in accordance with aspects of various embodiments.

FIG. 6 is a flowchart illustrating example operations that use common node calculations for calculating multiple shortest path first trees rooted at different nodes. The technique illustrated in (and described with reference to FIG. 6) may be implemented by each spine node, in a data center, in a network element, or provisioned in another network to achieve the various features described herein. At block 602, the apparatus may initialize the distances for all spine nodes. For example, set the tentative distance value to zero for all spine nodes and to infinity for all other nodes.

At block 604, the apparatus may add the spine nodes into a priority queue. At block 606, the apparatus may determine if the priority queue is empty. If the priority queue is empty, at block 608, the apparatus may identify a shortest path distance to each spine node for every node. If the priority queue is not empty, at block 610, the apparatus may dequeue a node. The node may be one of the nodes in a network. The node may be a leaf node.

At block 612, the apparatus may determine if all the edges for the node have been explored. If all the edges have been explored, the apparatus may repeat block 606. If not all of the edges have been explored, at block 614, the apparatus may explore the neighbors of the node.

At block 616, the apparatus may update distinct neighbor distances for every spine node. At block 618, the apparatus may determine whether the node will be used. The apparatus may determine whether the node will be used in a shortest path tree. For example, the node may be used in a shortest path tree if it is part of the shortest path to the destination. If the node will not be used, at block 620, the apparatus may set the distances to infinity. The distances may be set for the node that is not used. If the node is used, the apparatus may return to block 612.

Figure 7:
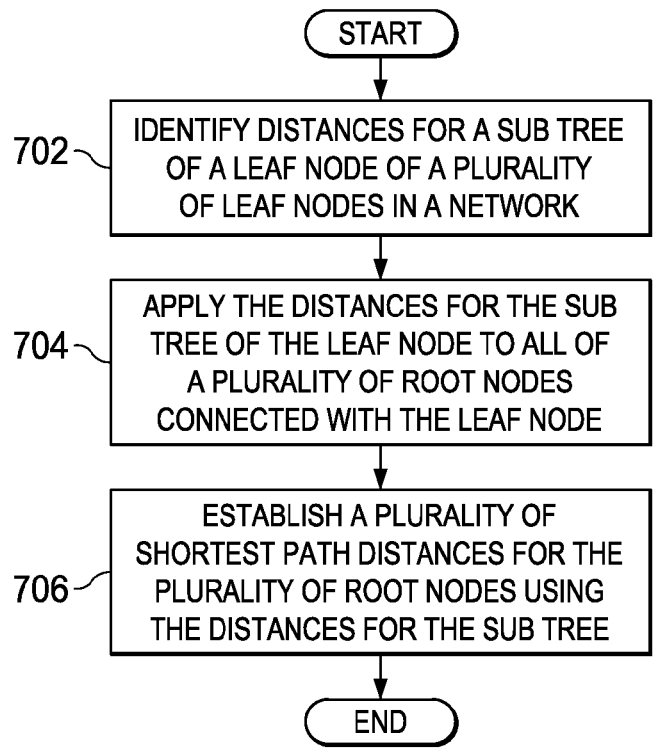
FIG. 7 is a flowchart illustrating operation of an exemplary embodiment using common node calculations for calculating multiple shortest path first trees rooted at different nodes in accordance with aspects of various embodiments.

FIG. 7 is a flowchart illustrating example operations associated with using common node calculations for calculating multiple shortest path first trees rooted at different nodes in accordance with aspects of various embodiments. The technique illustrated in (and described with reference to FIG. 7) may be implemented by each spine node, in a data center, in a network element, or provisioned in another network to achieve the various features described herein. Referring to FIG. 7, at block 702, an apparatus may identify distances for a sub-tree of a leaf node of a plurality of leaf nodes in a network. At block 704, the apparatus may apply the distances for the sub-tree of the leaf node to a plurality of root nodes connected to the leaf node. At block 706, the apparatus may establish a plurality of shortest path distances for the plurality of root nodes using the distances for the sub-tree.

Figure 8:
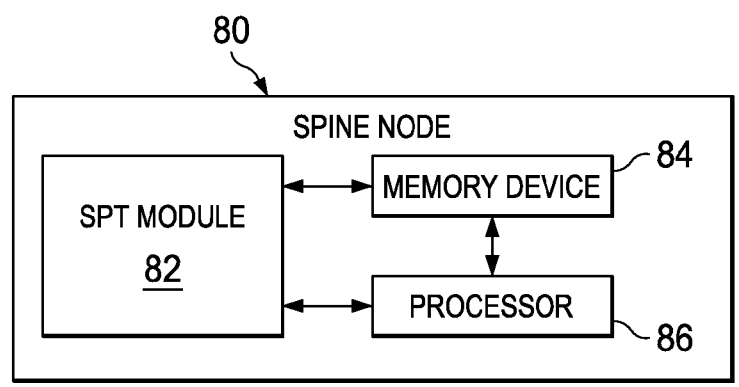
FIG. 8 illustrates a spine node example in accordance with an embodiment.

FIG. 8 illustrates a spine node 80 in accordance with one example embodiment. In one example implementation, various devices involved in implementing the embodiments described herein can include software for achieving the described functions. FIG. 8 may include a shortest path tree (SPT) module 82, which may include software embodied in one or more non-transitory, tangible media for facilitating the activities described herein. Spine node 80 may also include a memory device (or memory element) 84 for storing information to be used in achieving the functions as outlined herein. Additionally, spine node 80 may include a processor 86 that is capable of executing software or an algorithm (such as embodied in SPT module 82) to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in FIGS. 5-8 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as shown in FIG. 8, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 8, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein (e.g., the various VTEPs, spine nodes, leaf nodes, root nodes) can be provisioned as part of any type of network element. As used herein, the terms "network element", "network device", "leaf node", "root node", "spine node", "switch", etc. can encompass computers, servers, network appliances, hosts, routers, switches, gateways, bridges, virtual equipment, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the computational activities discussed herein. This could include the implementation of instances of any of the components, engines, logic, etc. shown in the FIGURES (e.g., instances of SPT modules 82). Additionally, each of these network elements can have an internal structure (e.g., a processor, a memory element, etc.) to facilitate some of the operations described herein. In other embodiments, these computational activities may be executed externally to these network elements, or included in some other network element to achieve the intended functionality. Alternatively, these network devices may include software (or reciprocating software) that can coordinate with other network elements in order to achieve the computational activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    identifying by a switch, distances for a sub-tree of a leaf node of a plurality of leaf nodes in a network;
    applying, by the switch, the distances for the sub-tree of the leaf node to a plurality of root nodes connected to the leaf node; and
    establishing, by the switch, a plurality of shortest path distances for the plurality of root nodes using the distances for the sub-tree;
    generate, by the switch, a plurality of shortest path trees (SPTs) for the network based, at least in part, on the plurality of shortest path distances, wherein each of the plurality of leaf nodes has a corresponding shortest path tree in the plurality of shortest path trees;
    receive, by the switch, an indication that one or more of the plurality of leaf nodes is to receive traffic corresponding to a group interest, wherein the switch receives the indication as a Border Gateway Protocol message transmitted from a route reflector in the network; and
    transmitting from the switch, the traffic to the one or more of the plurality of leaf nodes, wherein the traffic is multicast to each of the one or more of the plurality of leaf nodes using the corresponding shortest path tree.

2. The method of claim 1, further comprising:
    determining whether a particular node will be used according to a Transparent Interconnection of Lots of Links (TRILL) policy; and
    responsive to the particular node not being used, setting a distance for the particular node to be infinity.

3. The method of claim 1, wherein identifying distances for the sub-tree of the leaf node of the plurality of leaf nodes in the network further comprises:
    exploring a plurality of neighbor nodes of the leaf node in the sub-tree; and
    identifying a distance for each neighbor node of the plurality of neighbor nodes for each root node of the plurality of root nodes.

4. The method of claim 1, wherein each of the root nodes is a spine switch and each of the leaf nodes is a leaf switch.

5. The method of claim 1, wherein the network includes a plurality of distribution trees that further comprises a plurality of secondary leaf nodes, and wherein the plurality of secondary leaf nodes is part of the sub-tree.

6. The method of claim 1, wherein leaf nodes loadbalance multicast traffic by selecting a distribution tree based on hashing a particular payload when there are multiple trees available.

7. The method of claim 1, wherein the plurality of SPTs are generated based, at least in part, on at least one loadbalancing requirement.

8. An apparatus comprising at least one processor and at least one memory, the at least one memory including computer program instructions that, when executed by the at least one processor, cause the apparatus to:

identify a plurality of distances for a sub-tree of a leaf node of a plurality of leaf nodes in a network;

apply the distances for the sub-tree of the leaf node to a plurality of root nodes connected to the leaf node;

establish a plurality of shortest path distances for the plurality of root nodes using the distances for the sub-tree;

generate a plurality of shortest path trees (SPTs) for the network based, at least in part, on the plurality of shortest path distances, wherein each of the plurality of leaf nodes has a corresponding shortest path tree in the plurality of shortest path trees;

receive an indication that one or more of the plurality of leaf nodes is to receive traffic corresponding to a group interest, wherein the switch receives the indication as a Border Gateway Protocol message transmitted from a route reflector in the network; and transmit, from the apparatus, the traffic to the one or more of the plurality of leaf nodes, wherein the traffic is multicast to each of the one or more of the plurality of leaf nodes using the corresponding shortest path tree.

9. The apparatus of claim 8, wherein the computer program instructions, when executed by the at least one processor, further cause the apparatus to:

determine whether a particular node will be used according to a Transparent Interconnection of Lots of Links (TRILL) policy; and responsive to the particular node not being used, set a distance for the particular node to be infinity.

10. The apparatus of claim 8, wherein the identifying of the distances for the sub-tree of the leaf node of the plurality of leaf nodes in the network further comprises:

exploring a plurality of neighbor nodes of the leaf node in the sub-tree; and identifying a distance for each neighbor node of the plurality of neighbor nodes for each root node of the plurality of root nodes.

11. The apparatus of claim 8, wherein each of the root nodes is a spine switch and each of the leaf nodes is a leaf switch.

12. The apparatus of claim 8, wherein the network includes a plurality of distribution trees that further comprises a plurality of secondary leaf nodes, and wherein the plurality of secondary leaf nodes is part of the sub-tree.

13. The apparatus of claim 8, wherein leaf nodes loadbalance multicast traffic by selecting a distribution tree based on hashing a particular payload when there are multiple trees available.

14. The apparatus of claim 8, wherein the plurality of SPTs are generated least in part, on at least on loadbalancing requirement.

15. A non-transitory computer readable medium comprising instructions that, when executed by a processor, cause an apparatus to:

identify a plurality of distances for a sub-tree of a leaf node of a plurality of leaf nodes in a network;

apply the distances for the sub-tree of the leaf node to a plurality of root nodes connected to the leaf node;

establish a plurality of shortest path distances for the plurality of root nodes using the distances for the sub-tree.

generate a plurality of shortest path trees (SPTs) for the network based, at least in part, on the plurality of shortest path distances, wherein each of the plurality of leaf nodes has a corresponding shortest path tree in the plurality of shortest path trees;

receive an indication that one or more of the plurality of leaf nodes is to receive traffic corresponding to a group interest, wherein the switch receives the indication as a Border Gateway Protocol message transmitted from a route reflector in the network; and transmit the traffic to the one or more of the plurality of leaf nodes, wherein the traffic is multicast to each of the one or more of the plurality of leaf nodes using the corresponding shortest path tree.

16. The non-transitory computer readable medium of claim 15, wherein the instructions further cause the apparatus to:

determine whether a particular node will be used according to a Transparent Interconnection of Lots of Links (TRILL) policy; and responsive to the particular node not being used, set a distance for the particular node to be infinity.

17. The non-transitory computer readable medium of claim 15, wherein the identifying of the distances for the sub-tree of the leaf node of the plurality of leaf nodes in the network further comprises:

exploring a plurality of neighbor nodes of the leaf node in the sub-tree; and identifying a distance for each neighbor node of the plurality of neighbor nodes for each root node of the plurality of root nodes.

18. The non-transitory computer readable medium of claim 15, wherein each of the root nodes is a spine switch and each of the leaf nodes is a leaf switch.

19. The non-transitory computer readable medium of claim 15, wherein the network includes a plurality of distribution trees that further comprises a plurality of secondary leaf nodes, and wherein the plurality of secondary leaf nodes is part of the sub-tree.

20. The non-transitory computer readable medium of claim 15, wherein leaf nodes loadbalance multicast traffic by selecting a distribution tree based on hashing a payload when there are multiple trees available.

* * * * *